United States Patent
Armitage et al.

(10) Patent No.: US 10,151,227 B2
(45) Date of Patent: Dec. 11, 2018

(54) NITROGEN OXIDES (NOX) STORAGE CATALYST

(71) Applicant: Johnson Matthey Public Limited Company, London (GB)

(72) Inventors: Andrew Armitage, Royston (GB); Andrew Francis Chiffey, Royston (GB); John Benjamin Goodwin, Royston (GB); James Leeland, Royston (GB); Nuria Lastra-Calvo, Royston (GB); Francois Moreau, Royston (GB); Paul Richard Phillips, Royston (GB); Stuart David Reid, Royston (GB); Daniel Swallow, Royston (GB); David Xuereb, Royston (GB)

(73) Assignee: Johnson Matthey Public Limited Company, London (GB)

( * ) Notice: Subject to any disclaimer, the term of this patent is extended or adjusted under 35 U.S.C. 154(b) by 44 days.

(21) Appl. No.: 15/205,020

(22) Filed: Jul. 8, 2016

(65) Prior Publication Data
US 2017/0009623 A1    Jan. 12, 2017

(30) Foreign Application Priority Data
Jul. 9, 2015   (GB) .................................. 1512056.1

(51) Int. Cl.
| | |
|---|---|
| F01N 3/08 | (2006.01) |
| B01D 53/94 | (2006.01) |
| F01N 3/10 | (2006.01) |
| B01J 23/656 | (2006.01) |
| B01J 37/02 | (2006.01) |
| B01J 35/00 | (2006.01) |
| B01J 23/34 | (2006.01) |
| B01J 29/74 | (2006.01) |
| B01J 29/78 | (2006.01) |
| B01J 23/63 | (2006.01) |
| B01J 35/04 | (2006.01) |
| B01D 46/24 | (2006.01) |
| B01J 23/00 | (2006.01) |

(52) U.S. Cl.
CPC ....... *F01N 3/0814* (2013.01); *B01D 46/2418* (2013.01); *B01D 53/9422* (2013.01); *B01D 53/9468* (2013.01); *B01D 53/9477* (2013.01); *B01J 23/34* (2013.01); *B01J 23/63* (2013.01); *B01J 23/6562* (2013.01); *B01J 29/7415* (2013.01); *B01J 29/7815* (2013.01); *B01J 35/0006* (2013.01); *B01J 35/04* (2013.01); *B01J 37/0244* (2013.01); *B01J 37/0246* (2013.01); *F01N 3/10* (2013.01); *B01D 2255/1021* (2013.01); *B01D 2255/1023* (2013.01); *B01D 2255/1025* (2013.01); *B01D 2255/2042* (2013.01); *B01D 2255/2047* (2013.01); *B01D 2255/2065* (2013.01); *B01D 2255/2073* (2013.01); *B01D 2255/2092* (2013.01); *B01D 2255/30* (2013.01); *B01D 2255/405* (2013.01); *B01D 2255/407* (2013.01); *B01D 2255/502* (2013.01); *B01D 2255/904* (2013.01); *B01D 2255/9022* (2013.01); *B01D 2255/9025* (2013.01); *B01D 2255/91* (2013.01); *B01J 23/005* (2013.01); *B01J 37/0234* (2013.01); *B01J 37/0248* (2013.01); *F01N 2570/14* (2013.01)

(58) Field of Classification Search
None
See application file for complete search history.

(56) References Cited

U.S. PATENT DOCUMENTS

| | | | |
|---|---|---|---|
| 9,636,634 B2 * | 5/2017 | Chiffey | ................ B01J 23/66 |
| 2005/0129601 A1 * | 6/2005 | Li | ................ B01D 53/9418 |
| | | | 423/239.2 |
| 2015/0202600 A1 * | 7/2015 | Chiffey | ................ B01J 23/66 |
| | | | 422/171 |

* cited by examiner

*Primary Examiner* — Walter D. Griffin
*Assistant Examiner* — Jelitza M Perez
(74) *Attorney, Agent, or Firm* — Gary D. Mangels

(57) ABSTRACT

A catalyst for storing nitrogen oxides ($NO_x$) in an exhaust gas from a lean burn engine comprising a $NO_x$ storage material and a substrate, wherein the $NO_x$ storage material comprises a $NO_x$ storage component and an NO oxidation promoter on a support material, wherein the NO oxidation promoter is manganese or an oxide, hydroxide or carbonate thereof.

21 Claims, No Drawings

NITROGEN OXIDES (NOX) STORAGE CATALYST

CROSS REFERENCE TO RELATED APPLICATIONS

This application claims priority benefit to Great Britain Patent Application No. 1512056.1 filed on Jul. 9, 2015, which is incorporated herein by reference.

FIELD OF THE INVENTION

The invention relates to a catalyst for storing nitrogen oxides ($NO_x$) in an exhaust gas from a lean burn engine. The invention further relates to an exhaust system for a lean burn engine comprising the catalyst and to a vehicle comprising the exhaust system. The invention also relates to a method of treating an exhaust gas from a lean burn engine.

BACKGROUND TO THE INVENTION

Lean burn engines, such as diesel engines, are generally operated at a higher than stoichiometric air to fuel mass ratio to improve fuel combustion efficiency and to provide good fuel economy. The exhaust emission produced by such engines generally contains at least four classes of pollutant that are legislated against by inter-governmental organisations throughout the world: carbon monoxide (CO), unburned hydrocarbons (HCs), oxides of nitrogen ($NO_x$) and particulate matter (PM). Emissions standards for lean burn engines, whether stationary or mobile (e.g. vehicular engines), are being progressively tightened. There is a need to provide improved emissions control devices that are able to meet these standards. One such emissions control device is a nitrogen oxides ($NO_x$) storage catalyst (NSC). NSCs are also referred to in the art as $NO_x$ adsorber catalysts (NACs), lean $NO_x$ traps (LNTs), deNO$_x$ traps (DNTs) or $NO_x$ storage/reduction (NSR) catalysts.

During normal operation, a lean burn engine produces an exhaust emission having a "lean" composition. The NSC is used to store or trap the nitrogen oxides ($NO_x$) that are present. Nitrogen dioxide ($NO_2$) present in the exhaust emission is typically adsorbed by a $NO_x$ storage component of the NSC, which stores the $NO_2$ through the formation of an inorganic nitrate. The nitric oxide (NO) component of $NO_x$ in the exhaust emission is usually catalytically oxidised by the NSC to nitrogen dioxide ($NO_2$). The additional $NO_2$ that is formed may then be stored by the $NO_x$ storage component of the NSC.

To release the $NO_x$ from the $NO_x$ storage component, such as when the $NO_x$ storage component is about to reach its storage capacity, the lean burn engine may be run under rich conditions to produce an exhaust emission having a "rich" composition. Under these conditions, the inorganic nitrates of the $NO_x$ storage component decompose and form mainly nitrogen dioxide ($NO_2$) and some nitric oxide (NO). The NSC may contain a platinum group metal component that is able to catalytically reduce the released $NO_x$ to $N_2$ or $NH_3$ with hydrocarbons (HCs), carbon monoxide (CO) or hydrogen ($H_2$) present in the exhaust emission.

SUMMARY OF THE INVENTION

The invention provides a catalyst for storing nitrogen oxides ($NO_x$) in an exhaust gas from a lean burn engine. The catalyst comprises a nitrogen oxides ($NO_x$) storage material and a substrate, wherein the nitrogen oxides ($NO_x$) storage material comprises a nitrogen oxides ($NO_x$) storage component and a nitric oxide (NO) oxidation promoter on a support material, wherein the NO oxidation promoter is manganese or an oxide, hydroxide or carbonate thereof.

The inventors have surprisingly found that a material having excellent $NO_x$ storage capability can be obtained when a nitrogen oxides ($NO_x$) storage component is combined with manganese. It is believed that the manganese component either oxidises, or facilitates the oxidation of, nitric oxide (NO) in an exhaust gas to nitrogen dioxide ($NO_2$). This $NO_2$ can then be stored by the $NO_x$ storage component as an inorganic nitrate.

Some $NO_x$ storage catalyst formulations contain platinum to oxidise nitric oxide (NO) to nitrogen dioxide ($NO_2$). The inclusion of manganese or an oxide, hydroxide or carbonate thereof may allow a reduction in the amount of platinum that is included in a $NO_x$ storage catalyst formulation, at least when the platinum used specifically to oxidise NO to $NO_2$.

When manganese or an oxide, hydroxide or carbonate thereof is used in combination platinum on certain alumina based support materials, it has been found that advantageous NO oxidative activity can be obtained. This advantageous activity can be used to facilitate $NO_x$ storage by converting the NO in an exhaust gas into $NO_2$ so that an inorganic nitrate may be formed more readily. It may further assist in the conversion of any NO to $NO_2$ that is released from, or passes through, the $NO_x$ storage material.

Advantageously, the catalyst of the invention may show relatively stable NO oxidation activity over its lifetime. Thus, the difference in NO oxidation activity of the catalyst in a fresh state (i.e. when it is "new" and has not been subjected to repeated, prolonged use) and an aged state is typically small.

A further advantage of the invention is that when manganese is combined with platinum, preferably as part of the same catalytic material, advantageous CO oxidative activity can be obtained, particularly excellent low temperature CO oxidation activity. Such a combination may be effective in converting relatively high levels of CO in exhaust gas produced by the lean burn engine, particularly at temperatures below 250° C. Catalysts containing such a combination ay also show good oxidation activity towards HCs.

The invention also relates to an exhaust system for a lean burn engine. The exhaust system comprises a catalyst of the invention and optionally an emissions control device.

The catalyst of the invention can be used to convert NO into $NO_2$ when $NO_x$ is released from the $NO_x$ storage material or when the exhaust gas passes through the catalyst. The additional $NO_2$ that is produced can aid the regeneration of a downstream diesel particulate filter (DPF) or a downstream catalysed soot filter (CSF). Generally, the $NO_2$ generated by the catalyst increases the ratio of $NO_2$:NO in the exhaust gas at the outlet of the catalyst in comparison to the exhaust gas at the inlet of the catalyst. This increased ratio can be advantageous for exhaust systems comprising a downstream selective catalytic reduction (SCR) catalyst or a selective catalytic reduction filter (SCRF™) catalyst. The ratio of $NO_2$:NO in the exhaust gas produced directly by a diesel engine may be too low for optimum SCR or SCRF™ catalyst performance.

The catalyst may also be formulated to generate ammonia ($NH_3$) for use as a reductant with a downstream SCR catalyst or SCRF™ catalyst (e.g. under rich conditions). The $NH_3$ generated allows passive selective catalytic reduction to occur without the active introduction of $NH_3$.

The invention further relates to a vehicle. The vehicle comprises a lean burn engine and either a catalyst of the invention or an exhaust system of the invention.

A further aspect of the invention relates to a method of treating an exhaust gas from a lean burn engine. The method comprises contacting an exhaust gas produced by the lean burn engine with a catalyst of the invention.

DETAILED DESCRIPTION OF THE INVENTION

The catalyst of the invention comprises a NO storage material and a substrate, wherein the $NO_x$ storage material comprises a $NO_x$ storage component and an NO oxidation promoter on a support material. Typically, the catalyst further comprises at least one platinum group metal (PGM).

The $NO_x$ storage material comprises, or may consist essentially of, a $NO_x$ storage component and an NO oxidation promoter on a support material.

Typically, the $NO_x$ storage component comprises an alkali metal, an alkaline earth metal and/or a rare earth metal. The $NO_x$ storage component generally comprises, or consists essentially of, (i) an oxide, a carbonate or a hydroxide of an alkali metal; (ii) an oxide, a carbonate or a hydroxide of an alkaline earth metal; and/or (iii) an oxide, a carbonate or a hydroxide of a rare earth metal.

When the $NO_x$ storage component comprises an alkali metal (or an oxide, a carbonate or a hydroxide thereof), then preferably the alkali metal is selected from the group consisting of potassium (K), sodium (Na), lithium (Li), caesium (Cs) and a combination of two or more thereof. It is preferred that the alkali metal is potassium (K), sodium (Na) or lithium (Li), more preferably the alkali metal is potassium (K) or sodium (Na), and most preferably the alkali metal is potassium (K).

When the $NO_x$ storage component comprises an alkaline earth metal (or an oxide, a carbonate or a hydroxide thereof), then preferably the alkaline earth metal is selected from the group consisting of magnesium (Mg), calcium (Ca), strontium (Sr), barium (Ba) and a combination of two or more thereof. It is preferred that the alkaline earth metal is calcium (Ca), strontium (Sr), or barium (Ba), more preferably strontium (Sr) or barium (Ba), and most preferably the alkaline earth metal is barium (Ba).

When the $NO_x$ storage component comprises a rare earth metal (or an oxide, a carbonate or a hydroxide thereof), then preferably the rare earth metal is selected from the group consisting of cerium (Ce), lanthanum (La), yttrium (Y) and a combination thereof. More preferably, the rare earth metal is cerium (Ce).

Typically, the $NO_x$ storage component comprises, or consists essentially of, (i) an oxide, a carbonate or a hydroxide of a rare earth metal and/or (ii) an oxide, a carbonate or a hydroxide of an alkaline earth metal. It is preferred that the $NO_x$ storage component comprises, or consists essentially of, an oxide, a carbonate or a hydroxide of an alkaline earth metal.

It is preferred that the $NO_x$ storage component comprises barium (Ba) (e.g. an oxide, a carbonate or a hydroxide of barium (Ba)). More preferably, the $NO_x$ storage component comprises barium (e.g. an oxide, a carbonate or a hydroxide of barium (Ba)) and cerium (e.g. an oxide, a carbonate or a hydroxide of cerium (Ce), preferably ceria).

Typically, the $NO_x$ storage component is disposed or supported on the support material. The $NO_x$ storage component may be disposed directly onto or is directly supported by the support material (e.g. there is no intervening support material between the $NO_x$ storage component and the support material).

The NO oxidation promoter is manganese or an oxide, hydroxide (e.g. $Mn(OH)_2$) or a carbonate (e.g. $MnCO_3$) thereof. Examples of suitable oxides of manganese may include MnO, $Mn_3O_4$, $Mn_2O_3$, $MnO_2$ and/or $Mn_2O_7$. The chemical composition of the manganese component of the $NO_x$ storage material will depend on the composition of the exhaust (e.g. a "rich" or "lean" exhaust gas) and the temperature of the catalyst.

When the NO oxidation promoter is an oxide of manganese, the oxide of manganese is a binary compound (e.g. the compound only contains the elements oxygen (O) and manganese (Mn)).

For the avoidance of doubt, the NO oxidation promoter is not a mixed oxide comprising ceria ($CeO_2$), zirconia ($ZrO_2$) or yttria ($Y_2O_3$). In particular, the NO oxidation promoter is not a mixed oxide comprising a rare earth metal or a transition metal other than manganese.

Advantageous NO oxidation can be obtained without mixing the manganese component with another oxide, such as ceria ($CeO_2$), zirconia ($ZrO_2$) or yttria ($Y_2O_3$).

Typically, the NO oxidation promoter is disposed or supported on the support material. The NO oxidation promoter may be disposed directly onto or is directly supported by the support material (e.g. there is no intervening support material between the NO oxidation promoter and the support material).

The support material generally comprises an oxide of aluminium. Typically, the support material comprises alumina. The alumina may or may not be doped with a dopant. It is to be understood that any reference to "doped" in this context refers to a material where the bulk or host lattice of the alumina is substitution doped or interstitially doped with a dopant. Alumina doped with a dopant can be prepared using methods known in the art.

The alumina may be doped with a dopant selected from the group consisting of silicon (Si), magnesium (Mg), barium (Ba), lanthanum (La), cerium (Ce), titanium (Ti), zirconium (Zr) and a combination of two or more thereof. It is preferred that the dopant is selected from the group consisting of silicon (Si), magnesium (Mg), barium (Ba) and cerium (Ce). More preferably, the dopant is selected from the group consisting of silicon (Si), magnesium (Mg) and barium (Ba). Even more preferably, the dopant is magnesium (Mg).

When the alumina is doped, the total amount of dopant is 0.25 to 5% by weight, preferably 0.5 to 3% by weight (e.g. about 1% by weight) of the alumina.

In general, it is preferred that the support material comprises, or consists essentially of, an oxide of magnesium and aluminium. The oxide of magnesium and aluminium may comprise, or consist essentially of, magnesium aluminate ($MgAl_2O_4$ [e.g. spinel]) and/or a mixed oxide of magnesium oxide (MgO) and aluminium oxide ($Al_2O_3$). A mixed oxide of magnesium oxide and aluminium oxide can be prepared using methods known in the art, such as by using the processes described in U.S. Pat. No. 6,217,837 or DE 19503522 A1.

The mixed oxide of magnesium oxide (MgO) and aluminium oxide ($Al_2O_3$) typically comprises, or consists essentially of, 1.0 to 40.0% by weight of magnesium oxide (based on the total weight of the mixed oxide), such as 1.0 to 30.0% by weight, preferably 5.0 to 28.0% by weight (e.g. 5.0 to 25.0% by weight), more preferably 10.0 to 25.0% by weight of magnesium oxide.

The mixed oxide of magnesium oxide (MgO) and aluminium oxide ($Al_2O_3$) is typically a homogeneous mixed oxide of magnesium oxide (MgO) and aluminium oxide ($Al_2O_3$). In a homogeneous mixed oxide, magnesium ions occupy the positions within the lattice of aluminium ions. It is difficult to distinguish the X-ray structure of such a homogeneous mixed oxide material from the X-ray structure of pure alumina.

Generally, a support material comprising, or consisting essentially of, a mixed oxide of magnesium oxide (MgO) and aluminium oxide ($Al_2O_3$) is preferred.

The presence of magnesium or an oxide thereof in an alumina based support material may improve the thermal stability of the resulting material in comparison to alumina by itself. The magnesium or an oxide thereof in the support material may also reduce or prevent the formation of a manganese containing spinel with alumina.

For the avoidance of doubt, the support material, the oxide of aluminium thereof or the oxide of magnesium and aluminium thereof, is not doped with a dopant comprising manganese. In particular, the support material, the oxide of aluminium thereof or the oxide of magnesium and aluminium thereof, is not promoted with a promoter, such as a promoter selected from the group consisting of tin, manganese, indium, group VIII metal (e.g. Fe, Co, Ni, Ru, Rh, Pd, Os, Ir and Pt, particularly Ir) and combinations thereof.

The $NO_x$ storage component and the NO oxidation promoter are disposed or supported on the same support material. When the $NO_x$ storage component and an NO oxidation promoter are in close proximity, advantageous $NO_x$ storage activity can be obtained. The manganese component facilitates the oxidation of nitric oxide (NO) to nitrogen dioxide ($NO_2$), which may be readily stored in the form of an inorganic nitrate when the $NO_x$ storage component is nearby.

Generally, the catalyst of the invention comprises a plurality of particles of the $NO_x$ storage material. Each particle of the $NO_x$ storage material comprises a particle of the $NO_x$ storage component disposed or supported on a particle of the support material and a particle of the NO oxidation promoter disposed or supported on the particle of the support material (i.e. the same particle of the support material on which the $NO_x$ storage component is disposed or supported). Typically, each particle of the $NO_x$ storage material comprises, or consists essentially of, one or more particles of the $NO_x$ storage component disposed or supported on a particle of the support material and one or more particles of the NO oxidation promoter disposed or supported on the particle of the support material.

In a first $NO_x$ storage material embodiment, the $NO_x$ storage material does not comprise platinum and/or palladium. More preferably, the $NO_x$ storage material does not comprise a platinum group metal (PGM) selected from the group consisting of platinum, palladium, rhodium and a combination of any two or more thereof. It has been found that excellent $NO_x$ storage results can be obtained without including expensive platinum group metals as part of the $NO_x$ storage material. When the catalyst of the invention is formulated to reduce $NO_x$ to $N_2$ or $NH_3$, then excellent catalytic activity can be obtained when the PGM is not part of the $NO_x$ storage material and is incorporated into the catalyst elsewhere.

In a second $NO_x$ storage material embodiment, the $NO_x$ storage material further comprises a platinum group metal (PGM). The PGM may be selected from the group consisting of platinum, palladium, rhodium and a combination of any two or more thereof. Preferably, the PGM is selected from platinum, palladium and a combination of platinum and palladium. More preferably, the PGM is platinum.

The inclusion of a PGM in the $NO_x$ storage material may enhance its activity. For example, there may be a synergistic interaction when Pt is used in combination with Mn, which enhances the nitric oxide (NO) oxidation activity of the material. When palladium (Pd) is included as part of the $NO_x$ storage material, the $NO_x$ storage capacity of the material may be improved.

When the $NO_x$ storage material comprises a PGM, then generally the PGM is disposed or supported on the support material. The PGM is preferably disposed directly onto or is directly supported by the support material (e.g. there is no intervening support material between the PGM and the support material).

In the second $NO_x$ storage material embodiment, each particle of the $NO_x$ storage material typically comprises a particle of the $NO_x$ storage component supported on a particle of the support material, a particle of the NO oxidation promoter supported on the particle of the support material and a particle of the PGM supported on the particle of the support material (i.e. the $NO_x$ storage component, the NO oxidation promoter and the PGM are supported on the same particle of the support material). Typically, each particle of the $NO_x$ storage material comprises, or consists essentially of, one or more particles of the $NO_x$ storage component supported on a particle of the support material, one or more particles of the NO oxidation promoter supported on the particle of the support material, and one or more particles of the PGM supported on the particle of the support material.

The catalyst of the invention comprises a $NO_x$ storage material (e.g. the $NO_x$ storage material of the first or second $NO_x$ storage material embodiments) and a substrate. The $NO_x$ storage material may be dispersed in the substrate (e.g. the $NO_x$ storage material is part of an extrudate that is used to form the substrate). The substrate may be an extruded solid body comprising the $NO_x$ storage material.

When the substrate is an extruded solid body, then the substrate may comprise the $NO_x$ storage region. Any reference below to a $NO_x$ reduction region and/or an oxidation region being disposed or supported on the $NO_x$ storage region therefore relates to $NO_x$ reduction region and/or an oxidation region being disposed or supported on the substrate (which comprises the $NO_x$ storage material or region).

The extruded solid body typically comprises, or consists essentially of, 5 to 95% by weight of the $NO_x$ storage material and 5 to 95% of a binder/matrix component, preferably 15 to 85% by weight of the $NO_x$ storage material and 15 to 85% of the binder/matrix component, more preferably 25 to 75% by weight (e.g. 25 to 50% by weight) of the $NO_x$ storage material and 25 to 75% by weight (e.g. 25 to 50% by weight) of the binder/matrix component The binder/matrix component can be selected from the group consisting of cordierite, a nitride, a carbide, a boride, a spinel, a refractory oxide, lithium aluminosilicate, zircon and mixtures of any two or more thereof. The refractory oxide may be selected from the group consisting of optionally doped alumina, silica, titania, zirconia, and mixtures of any two or more thereof.

In general, it is preferred that the catalyst of the invention comprises a $NO_x$ storage material disposed on the substrate. The catalyst typically comprises a $NO_x$ storage region comprising, or consisting essentially of, the $NO_x$ storage material disposed on the substrate. More preferably, the $NO_x$ storage region is directly disposed on the substrate (i.e. the $NO_x$ storage region is in contact with a surface of the substrate).

The $NO_x$ storage region may or may not comprise a platinum group metal. The Mn component of the $NO_x$ storage material may obviate the need to include a platinum group metal in the $NO_x$ storage region (e.g. for NO oxidation) whilst retaining excellent $NO_x$ storage activity. When a platinum group metal is, however, included in the $NO_x$ storage region, then enhanced NO oxidation and/or CO oxidation activity may be obtained.

Typically, the $NO_x$ storage region further comprises a $NO_x$ treatment material. The $NO_x$ storage region may therefore comprise, or consist essentially of, the $NO_x$ storage material and the $NO_x$ treatment material. For the avoidance of doubt, the $NO_x$ treatment material is different (e.g. different composition) to the $NO_x$ storage material. The $NO_x$ treatment material may have (a) $NO_x$ storage activity and/or NO oxidative activity [e.g. under lean conditions]; and/or (b) $NO_x$ reductive activity [e.g. under rich conditions].

The $NO_x$ treatment material comprises, or consists essentially of, a first $NO_x$ treatment component and/or a second $NO_x$ treatment component.

The terms "first" and "second" as used herein are labels to identify the $NO_x$ treatment components so that they may be distinguished from one another. The labelling of a $NO_x$ treatment component as a "second" component should not be interpreted as requiring the presence of the "first" $NO_x$ treatment component.

Typically, the first $NO_x$ treatment component comprises a first support material. The first support material comprises, or consists essentially of, ceria, or a mixed or composite oxide of ceria, such as a ceria-zirconia.

When the first support material comprises, or consists essentially of, a ceria-zirconia, then the ceria-zirconia may consist essentially of 20 to 95% by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia.

In general, the first $NO_x$ treatment component may comprise an NO oxidation promoter and/or a platinum group metal (PGM) and/or a $NO_x$ storage component.

The first $NO_x$ treatment component may comprise, or consist essentially of, an NO oxidation promoter disposed or supported (e.g. directly disposed or supported) on the first support material. The NO oxidation promoter is as defined hereinabove (e.g. the NO oxidation promoter is manganese or an oxide (e.g. MnO, $Mn_3O_4$, $Mn_2O_3$, $MnO_2$ and/or $Mn_2O_7$), hydroxide (e.g. $Mn(OH)_2$) or a carbonate (e.g. $MnCO_3$) thereof). In some instances, however, it may be preferable that the first $NO_x$ treatment component does not comprise the NO oxidation promoter.

Additionally or alternatively, the first $NO_x$ treatment component may comprise, or consist essentially of, a platinum group metal (PGM) disposed or supported (e.g. directly disposed or supported) on the first support material. The PGM may be selected from the group consisting of platinum, palladium, rhodium, a combination of platinum and palladium, a combination of platinum and rhodium, a combination of palladium and rhodium, and a combination of platinum, palladium and rhodium. It is preferred that the PGM is selected from the group consisting of palladium, rhodium and a combination of palladium and rhodium.

The PGM may be rhodium. The PGM may be palladium. Preferably, the PGM is palladium.

Additionally or alternatively, the first $NO_x$ treatment component may comprise, or consist essentially of, a $NO_x$ storage component disposed or supported (e.g. directly disposed or supported) on the first support material. The $NO_x$ storage component is as defined hereinabove. Thus, the $NO_x$ storage component generally comprises, or consists essentially of, (i) an oxide, a carbonate or a hydroxide of an alkali metal; (ii) an oxide, a carbonate or a hydroxide of an alkaline earth metal; and/or (iii) an oxide, a carbonate or a hydroxide of a rare earth metal, preferably a rare earth metal other than cerium (Ce). It is preferred that the $NO_x$ storage component comprises, or consists essentially of, an oxide, a carbonate or a hydroxide of an alkaline earth metal. The alkaline earth metal is preferably barium (Ba).

The second $NO_x$ treatment component typically comprises a second support material. The second support material generally comprises an oxide of aluminium. Typically, the support material comprises alumina.

The alumina may or may not be doped with a dopant. The dopant may be selected from the group consisting of silicon (Si), magnesium (Mg), barium (Ba), lanthanum (La), cerium (Ce), titanium (Ti), zirconium (Zr) and a combination of two or more thereof. It is preferred that the dopant is selected from the group consisting of silicon (Si), magnesium (Mg), barium (Ba) and cerium (Ce). More preferably, the dopant is selected from the group consisting of silicon, magnesium and barium. Even more preferably, the dopant is magnesium.

When the alumina is doped, the total amount of dopant is 0.25 to 5% by weight, preferably 0.5 to 3% by weight (e.g. about 1% by weight) of the alumina.

In general, it is preferred that the second support material comprises, or consists essentially of, an oxide of magnesium and aluminium. The oxide of magnesium and aluminium may comprise, or consist essentially of, magnesium aluminate ($MgAl_2O_4$ [e.g. spinel]) and/or a mixed oxide of magnesium oxide (MgO) and aluminium oxide ($Al_2O_3$). The mixed oxide of magnesium oxide (MgO) and aluminium oxide ($Al_2O_3$) is typically a homogeneous mixed oxide of magnesium oxide (MgO) and aluminium oxide ($Al_2O_3$).

The mixed oxide of magnesium oxide (MgO) and aluminium oxide ($Al_2O_3$) typically comprises, or consists essentially of, 1.0 to 40.0% by weight of magnesium oxide (based on the total weight of the mixed oxide), such as 1.0 to 30.0% by weight, preferably 5.0 to 28.0% by weight (e.g. 5.0 to 25.0% by weight), more preferably 10.0 to 25.0% by weight of magnesium oxide.

Generally, it is preferred that the second support material comprises, or consists essentially of, a mixed oxide of magnesium oxide (MgO) and aluminium oxide ($Al_2O_3$).

The second $NO_x$ treatment component may comprise, or consist essentially of, either:
(i) a NO oxidation promoter as defined hereinabove; or
(ii) a $NO_x$ storage component as defined hereinabove; and optionally
(iii) a platinum group metal (PGM);
wherein the NO oxidation promoter or the $NO_x$ storage component is disposed or supported (e.g. directly disposed or supported) on the second support material. When a platinum group metal is present, then the platinum group metal is disposed or supported (e.g. directly disposed or supported) on the second support material.

For the avoidance of doubt, the second $NO_x$ treatment component is different (e.g. different composition) to the $NO_x$ storage material. The second $NO_x$ treatment component does not comprise both (i) the NO oxidation promoter and (ii) the $NO_x$ storage component.

When the second $NO_x$ treatment component comprises an $NO_x$ oxidation promoter, then the $NO_x$ oxidation promoter is manganese or an oxide (e.g. MnO, $Mn_3O_4$, $Mn_2O_3$, $MnO_2$ and/or $Mn_2O_7$), hydroxide (e.g. $Mn(OH)_2$) or a carbonate (e.g. $MnCO_3$) thereof.

When the second $NO_x$ treatment component comprises a $NO_x$ storage component, then the $NO_x$ storage component preferably comprises, or consists essentially of, an oxide, a carbonate or a hydroxide of an alkaline earth metal, preferably barium (Ba) and optionally an oxide, a carbonate or a hydroxide of a rare earth metal (preferably cerium (Ce)). More preferably, the $NO_x$ storage component preferably comprises, or consists essentially of, an oxide, a carbonate or a hydroxide of barium (Ba) and ceria.

When the second $NO_x$ treatment component comprises a platinum group metal (PGM), the PGM may be selected from the group consisting of platinum, palladium, rhodium and a combination of any two or more thereof. Preferably, the PGM is selected from platinum, palladium and a combination of platinum and palladium. More preferably, the PGM is platinum.

If the $NO_x$ treatment material comprises, or consists essentially of, a first $NO_x$ treatment component and a second $NO_x$ treatment component, then preferably the $NO_x$ treatment material comprises ≥50% by weight of the first $NO_x$ treatment component and ≤50% by weight of the second $NO_x$ treatment component, more preferably ≥70% by weight of the first $NO_x$ treatment component and ≤30% by weight of the second $NO_x$ treatment component.

Typically, the $NO_x$ storage region has a concentration (i.e. total loading) of manganese (Mn) of 50 to 600 g $ft^{-3}$. It is preferred that the $NO_x$ storage region has a concentration of manganese (Mn) of 75 to 500 g $ft^{-3}$ (e.g. 100 to 400 g $ft^{-3}$), more preferably 125 to 350 g $ft^{-3}$ (e.g. 150 to 350 g $ft^{-3}$), still more preferably 200 to 350 g $ft^{-3}$.

The $NO_x$ storage region generally has a concentration (i.e. total loading) of $NO_x$ storage component of 250 to 1000 g $ft^{-3}$ (e.g. 300 to 950 g $ft^{-3}$), particularly 350 to 900 g $ft^{-3}$ (e.g. 400 to 850 g $ft^{-3}$), more particularly 450 to 800 g $ft^{-3}$.

In general, when the $NO_x$ storage region comprises a $NO_x$ treatment material, then preferably the $NO_x$ storage region comprises ≥50% by weight of the $NO_x$ storage material and ≤50% by weight of the $NO_x$ treatment material, more preferably ≥70% by weight of the $NO_x$ storage material and ≤30% by weight of the $NO_x$ treatment material.

The catalyst may further comprise a $NO_x$ reduction region. The $NO_x$ reduction region typically comprises, or consists essentially of, a $NO_x$ reduction component. The $NO_x$ reduction component comprises, or consists essentially of, rhodium disposed or supported (e.g. directly disposed or supported) on a support material.

The support material for the $NO_x$ reduction component typically comprises, or consists essentially of, an oxide of aluminium and/or an oxide of cerium.

When the support material for the $NO_x$ reduction component comprises an oxide of aluminium, then typically the support material comprises alumina. The alumina may or may not be doped with a dopant.

The alumina may be doped with a dopant selected from the group consisting of silicon (Si), magnesium (Mg), barium (Ba), lanthanum (La), cerium (Ce), titanium (Ti), zirconium (Zr) and a combination of two or more thereof. It is preferred that the dopant is selected from the group consisting of silicon, magnesium, barium and cerium. More preferably, the dopant is selected from the group consisting of silicon, magnesium and barium. Even more preferably, the dopant is magnesium.

When the alumina is doped, the total amount of dopant is 0.25 to 5% by weight, preferably 0.5 to 3% by weight (e.g. about 1% by weight) of the alumina.

In general, it is preferred that the support material for the $NO_x$ reduction component comprises, or consists essentially of, an oxide of magnesium and aluminium. The oxide of magnesium and aluminium may comprise, or consist essentially of, magnesium aluminate ($MgAl_2O_4$ [e.g. spinel]) and/or a mixed oxide of magnesium oxide (MgO) and aluminium oxide ($Al_2O_3$). The mixed oxide of magnesium oxide (MgO) and aluminium oxide ($Al_2O_3$) is typically a homogeneous mixed oxide of magnesium oxide (MgO) and aluminium oxide ($Al_2O_3$).

The mixed oxide of magnesium oxide (MgO) and aluminium oxide ($Al_2O_3$) typically comprises, or consists essentially of, 1.0 to 40.0% by weight of magnesium oxide (based on the total weight of the mixed oxide), such as 1.0 to 30.0% by weight, preferably 5.0 to 28.0% by weight (e.g. 5.0 to 25.0% by weight), more preferably 10.0 to 25.0% by weight of magnesium oxide.

Generally, a support material comprising, or consisting essentially of, a mixed oxide of magnesium oxide (MgO) and aluminium oxide ($Al_2O_3$) is preferred.

When the support material for the $NO_x$ reduction component comprises, or consists essentially of, an oxide of cerium, then the oxide of cerium may be ceria or a mixed or composite oxide of ceria, such as a ceria-zirconia. The ceria-zirconia may consist essentially of 20 to 95% by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia.

In general, it is preferred that the support material for the $NO_x$ reduction component comprises, or consists essentially of, an oxide of cerium.

For the avoidance of doubt, the $NO_x$ reduction component is different (i.e. different composition) to the $NO_x$ storage component. It is preferred that the $NO_x$ reduction component does not comprise manganese or an oxide (e.g. MnO, $Mn_3O_4$, $Mn_2O_3$, $MnO_2$ and/or $Mn_2O_7$), hydroxide (e.g. $Mn(OH)_2$) or a carbonate (e.g. $MnCO_3$) thereof.

Typically, the $NO_x$ reduction region has a concentration (e.g. total loading) of rhodium (i.e. as part of the $NO_x$ reduction component) of 1 to 50 g $ft^{-3}$, preferably 2 to 25 g $ft^{-3}$ (e.g. 2.5 to 22.5 g $ft^{-3}$), more preferably 3 to 20 g $ft^{-3}$, still more preferably 4 to 15 g $ft^{-3}$.

The $NO_x$ reduction region may have a concentration (e.g. total loading) of the support material for the $NO_x$ reduction component of 0.1 to 3.5 g $in^{-3}$ (e.g. 0.1 to 1.0 g $in^{-3}$), preferably 0.15 to 3.0 g $in^{-3}$ (e.g. 0.15 to 0.75 g $in^{-3}$), still more preferably 0.2 to 2.75 g $in^{-3}$ (0.2 to 0.5 g $in^{-3}$ or 0.75 to 2.5 g $in^{-3}$), and even more preferably 0.5 to 2.5 g $in^{-3}$ (e.g. 1.0 to 2.5 g $in^{-3}$).

The $NO_x$ reduction region may further comprise a third $NO_x$ treatment component. Thus, the $NO_x$ reduction region may comprise, or consist essentially of, a $NO_x$ reduction component and a third $NO_x$ treatment component.

The term "third" in this context is used to distinguish the $NO_x$ treatment component of the $NO_x$ reduction region from the $NO_x$ treatment component(s) of the $NO_x$ treatment material (labelled the "first" and "second" $NO_x$ treatment components). The term "third" does not require the presence of the "first" and "second" $NO_x$ treatment components.

The third $NO_x$ treatment component typically comprises a platinum group metal (PGM) disposed or supported (e.g.

directly disposed or supported) on a support material. For the avoidance of doubt, the third $NO_x$ treatment component is different to (i) the first $NO_x$ treatment component and/or (ii) the second $NO_x$ treatment component.

The PGM of the third $NO_x$ treatment component may be selected from the group consisting of platinum, palladium, rhodium and a combination of any two or more thereof. Preferably, the PGM is selected from platinum, palladium and a combination of platinum and palladium. The PGM may be platinum. The PGM may be palladium. The PGM may be platinum and palladium.

The support material of the third $NO_x$ treatment component comprises, or consists essentially of, ceria, or a mixed or composite oxide of ceria, such as a ceria-zirconia. The ceria-zirconia may consist essentially of 20 to 95% by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia.

It is preferred that the third $NO_x$ treatment component does not comprise the NO oxidation promoter as defined hereinabove (e.g. the NO oxidation promoter is manganese or an oxide (e.g. MnO, $Mn_3O_4$, $Mn_2O_3$, $MnO_2$ and/or $Mn_2O_7$), hydroxide (e.g. $Mn(OH)_2$) or a carbonate (e.g. $MnCO_3$) thereof).

Additionally or alternatively, it is preferred that the third $NO_x$ treatment component does not comprise a $NO_x$ storage component as defined hereinabove (e.g. an oxide, a carbonate or a hydroxide of an alkali metal, an alkaline earth metal and/or a rare earth metal (preferably with the exception of cerium).

Typically, the $NO_x$ reduction region comprises the PGM of the third $NO_x$ treatment component (i.e. as part of the third $NO_x$ treatment component) in a concentration (e.g. total loading) of 5 to 200 g $ft^{-3}$, preferably 10 to 175 g $ft^{-3}$ (e.g. 15 to 150 g $ft^{-3}$), more preferably 20 to 150 g $ft^{-3}$ (e.g. 50 to 125 g $ft^{-3}$), still more preferably 25 to 100 g $ft^{-3}$.

When the PGM of the third $NO_x$ treatment component is a combination of platinum and palladium, then typically third $NO_x$ treatment component comprises a ratio by weight of platinum to palladium of 20:1 to 1:20 (e.g. 15:1 to 1:15), preferably 10:1 to 1:10 (e.g. 7.5:1 to 1:7.5), more preferably 5:1 to 1:5 (e.g. 3:1 to 1:3), and even more preferably 2.5:1 to 1:1.

It is preferred that when the PGM of the third $NO_x$ treatment component is a combination of platinum and palladium, then the third $NO_x$ treatment component comprises a total weight of platinum that is greater than or equal to the total weight of palladium (e.g. the ratio of Pt:Pd by weight is ≥1:1). More preferably, the third $NO_x$ treatment component comprises a total weight of platinum that is greater than the total weight of palladium (e.g. the ratio of Pt:Pd by weight is >1:1).

It is preferred that the third $NO_x$ treatment component comprises a ratio by weight of platinum to palladium of 20:1 to 1:1 (e.g. 15.1:1 to 1.1:1), more preferably 10:1 to 1.25:1 (e.g. 7.5:1 to 1.5:1), and still more preferably 5:1 to 2:1.

The $NO_x$ reduction region may comprise the support material of the third $NO_x$ treatment component (i.e. as part of the third $NO_x$ treatment component) in a concentration (e.g. total loading) of 0.1 to 3.5 g $in^{-3}$ (e.g. 0.1 to 1.0 g $in^{-3}$), preferably 0.15 to 3.0 g $in^{-3}$ (e.g. 0.15 to 0.75 g $in^{-3}$), still more preferably 0.2 to 2.75 g $in^{-3}$ (0.2 to 0.75 g $in^{-3}$ or 0.5 to 2.5 g $in^{-3}$), and even more preferably 0.75 to 2.5 g $in^{-3}$.

The catalyst of the invention may further comprise an oxidation region. The oxidation region is for oxidising carbon monoxide (CO), hydrocarbons (HCs) and optionally nitric oxide (NO). For the avoidance of doubt, the oxidation region is different (i.e. different composition) to the $NO_x$ reduction region.

The oxidation region may be disposed or supported on the $NO_x$ storage region and/or the $NO_x$ reduction region.

The oxidation region typically comprises, or consists essentially of, (i) a platinum group metal (PGM) disposed or supported on a support material and optionally (ii) a hydrocarbon absorbent.

The PGM for the oxidation region may be selected from the group consisting of platinum, palladium, rhodium and a combination of any two or more thereof. It is preferred that the PGM is selected from the group consisting of platinum, palladium and a combination of platinum and palladium. More preferably, the PGM is selected from the group consisting of platinum and a combination of platinum and palladium.

The oxidation region may comprise the PGM for the oxidation region as the only platinum group metal(s). Thus, the only PGM(s) present in the oxidation region is/are defined by the PGM for the oxidation region.

The oxidation region typically has a concentration (i.e. a total loading) of the PGM of 5 to 300 g $ft^{-3}$, preferably 10 to 250 g $ft^{-3}$ (e.g. 75 to 175 g $ft^{-3}$), more preferably 15 to 200 g $ft^{-3}$ (e.g. 50 to 150 g $ft^{-3}$), still more preferably 20 to 150 g $ft^{-3}$.

When the PGM of the oxidation region is a combination of platinum and palladium, then typically the oxidation region comprises a ratio by weight of platinum to palladium of 20:1 to 1:20 (e.g. 15:1 to 1:15), preferably 10:1 to 1:10 (e.g. 7.5:1 to 1:7.5), more preferably 5:1 to 1:5 (e.g. 3:1 to 1:3), and even more preferably 2.5:1 to 1:1.

It is preferred that when the PGM of the oxidation region is a combination of platinum and palladium, then the oxidation region comprises a total weight of platinum that is greater than or equal to the total weight of palladium (e.g. the ratio of Pt:Pd by weight is ≥1:1). More preferably, the oxidation region comprises a total weight of platinum that is greater than the total weight of palladium (e.g. the ratio of Pt:Pd by weight is >1:1). Advantageous CO and/or HC light off activity can be obtained when the total weight of platinum is greater than or equal to the total weight of palladium in the oxidation region.

It is generally preferred that the oxidation region comprises a ratio by weight of platinum to palladium of 20:1 to 1:1 (e.g. 15.1:1 to 1.1:1), more preferably 10:1 to 1.25:1 (e.g. 7.5:1 to 1.5:1), and still more preferably 5:1 to 2:1.

Typically, the PGM of the oxidation region may be disposed directly onto or is directly supported by the support material (e.g. there is no intervening support material between the PGM and the support material). For example, platinum and/or palladium can be dispersed on the support material.

The support material of the oxidation region may comprise, or consist essentially of, a refractory oxide. Refractory oxides suitable for use as a catalytic component for a lean burn engine are well known in the art.

The refractory oxide is typically selected from the group consisting of alumina, silica, titania, zirconia, ceria and a mixed or composite oxide thereof, such as a mixed or composite oxide of two or more thereof. For example, the refractory metal oxide may be selected from the group consisting of alumina, silica, titania, zirconia, ceria, silica-alumina, titania-alumina, zirconia-alumina, ceria-alumina, titania-silica, zirconia-silica, zirconia-titania, ceria-zirconia and alumina-magnesium oxide.

The refractory oxide may optionally be doped (e.g. with a dopant). The dopant may be selected from the group consisting of zirconium (Zr), titanium (Ti), silicon (Si), yttrium (Y), lanthanum (La), praseodymium (Pr), samarium (Sm), neodymium (Nd) and an oxide thereof. When the refractory oxide is doped, the total amount of dopant is 0.25 to 5% by weight (i.e. of the refractory oxide), preferably 0.5 to 3% by weight (e.g. about 1% by weight).

The refractory oxide may comprise, or consist essentially of, alumina doped with a dopant. It is particularly preferred that the refractory oxide comprises, or consists essentially of, alumina doped with a dopant, particularly when the oxidation region comprises an alkaline earth metal.

The alumina may be doped with a dopant comprising silicon (Si), magnesium (Mg), barium (Ba), lanthanum (La), cerium (Ce), titanium (Ti), or zirconium (Zr) or a combination of two or more thereof. The dopant may comprise, or consist essentially of, an oxide of silicon, an oxide of magnesium, an oxide of barium, an oxide of lanthanum, an oxide of cerium, an oxide of titanium or an oxide of zirconium. Preferably, the dopant comprises, or consists essentially of, silicon, magnesium, barium, cerium, or an oxide thereof, particularly silicon, or cerium, or an oxide thereof. More preferably, the dopant comprises, or consists essentially of, silicon, magnesium, barium, or an oxide thereof; particularly silicon, magnesium, or an oxide thereof; especially silicon or an oxide thereof.

Examples of alumina doped with a dopant include alumina doped with silica, alumina doped with magnesium oxide, alumina doped with barium or barium oxide, alumina doped with lanthanum oxide, or alumina doped with ceria, particularly alumina doped with silica, alumina doped with lanthanum oxide, or alumina doped with ceria. It is preferred that the alumina doped with a dopant is alumina doped with silica, alumina doped with barium or barium oxide, or alumina doped with magnesium oxide. More preferably, the alumina doped with a dopant is alumina doped with silica or alumina doped with magnesium oxide. Even more preferably, the alumina doped with a dopant is alumina doped with silica.

When the alumina is alumina doped with silica, then the alumina is doped with silica in a total amount of 0.5 to 45% by weight (i.e. % by weight of the alumina), preferably 1 to 40% by weight, more preferably 1.5 to 30% by weight (e.g. 1.5 to 10% by weight), particularly 2.5 to 25% by weight, more particularly 3.5 to 20% by weight (e.g. 5 to 20% by weight), even more preferably 4.5 to 15% by weight.

It is preferred that the refractory oxide is not doped with a dopant comprising manganese. The support material of the oxidation region or the refractory oxide thereof is not promoted with a promoter selected from the group consisting of tin, manganese, indium, group VIII metal (e.g. Fe, Co, Ni, Ru, Rh, Pd, Os, Ir and Pt, particularly Ir) and combinations thereof.

In general, when the refractory oxide comprises or consists essentially of, a mixed or composite oxide of aluminium (e.g. silica-alumina, alumina-magnesium oxide or a mixture of alumina and ceria), then preferably the mixed or composite oxide of aluminium comprises at least 50 to 99% by weight of alumina, more preferably 70 to 95% by weight of alumina, even more preferably 75 to 90% by weight of alumina.

The oxidation region may comprise a concentration (e.g. total loading) of support material of 0.25 to 2.5 g in$^{-3}$ (e.g. 0.4 to 2.25 g in$^{-3}$), preferably 0.5 to 2.0 g in$^{-3}$ (e.g. 0.6 to 2.0 g in$^{-3}$), still more preferably 0.75 to 1.75 g in$^{-3}$ (0.75 to 1.5 g in$^{-3}$), and even more preferably 1.0 to 1.5 g in$^{-3}$.

The oxidation region may further comprise an alkaline earth metal disposed or supported (e.g. directly disposed or supported) on the support material, especially when the support material comprises a refractory oxide comprising alumina doped with silica.

The alkaline earth metal may be selected from magnesium (Mg), calcium (Ca), strontium (Sr), barium (Ba) and a combination of two or more thereof. The alkaline earth metal is preferably calcium (Ca), strontium (Sr), or barium (Ba), more preferably strontium (Sr) or barium (Ba), and most preferably the alkaline earth metal is barium (Ba).

In general, the oxidation region comprises a concentration of the alkaline earth metal of 10 to 350 g ft$^{-3}$ (e.g. 20 to 200 g ft$^{-3}$ or 100 to 300 g ft$^{-3}$), particularly 25 to 250 g ft$^{-3}$, more particularly 50 to 200 g ft$^{-3}$, such as 75 to 175 ft$^{-3}$.

When the oxidation region comprises an alkaline earth metal, then typically the oxidation region also comprises platinum. It is preferred the oxidation region comprises ratio by weight of the alkaline earth metal to platinum of 0.25:1 to 20:1 (e.g. 0.3:1 to 20:1), more preferably 0.5:1 to 17:1, such as 1:1 to 15:1, particularly 1.5:1 to 10:1, still more preferably 2:1 to 7.5:1, and even more preferably 2.5:1 to 5:1.

The oxidation region may further comprise a hydrocarbon absorbent. The hydrocarbon absorbent may be a zeolite.

It is preferred that the zeolite is a medium pore zeolite (e.g. a zeolite having a maximum ring size of ten tetrahedral atoms) or a large pore zeolite (e.g. a zeolite having a maximum ring size of twelve tetrahedral atoms). It may be preferable that the zeolite is not a small pore zeolite (e.g. a zeolite having a maximum ring size of eight tetrahedral atoms).

Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, offretite, a beta zeolite or a copper CHA zeolite. The zeolite is preferably ZSM-5, a beta zeolite or a Y zeolite.

When the oxidation region comprises a hydrocarbon absorbent, the concentration (e.g. total loading) of hydrocarbon absorbent is 0.05 to 1.5 g in$^{-3}$, particularly 0.10 to 1.25 g in$^{-3}$, more particularly 0.15 to 1.0 g in$^{-3}$. For example, the total amount of hydrocarbon adsorbent may be 0.2 to 0.75 g in$^{-3}$.

However, it may be preferable that the oxidation region does not comprise a hydrocarbon absorbent.

It may, however, be preferable that the oxidation region does not comprise rhodium and/or an alkali metal. Thus, the oxidation region may not comprise rhodium and/or an alkali metal, particularly an alkali metal disposed or supported on the support material.

For the avoidance of doubt, a general feature of the oxidation region (i.e. in any or all of the embodiments above) is that the oxidation region is substantially free of manganese. The oxidation region preferably does not comprise manganese.

The NO$_x$ storage region and/or the NO$_x$ reduction region may be disposed or supported on the substrate.

The NO$_x$ storage region may be disposed directly on to the substrate (i.e. the NO$_x$ storage region is in contact with a surface of the substrate). The NO$_x$ reduction region may be:

(a) disposed or supported on the NO$_x$ storage region; and/or (b) disposed directly on to the substrate [i.e. the $NO_x$ reduction region is in contact with a surface of the substrate]; and/or (c) in contact with the $NO_x$ storage region [i.e. the $NO_x$ reduction region is adjacent to, or abuts, the $NO_x$ storage region].

When the $NO_x$ reduction region is disposed directly on to the substrate, then a part or portion of the $NO_x$ reduction region may be in contact with the $NO_x$ storage region.

When the $NO_x$ reduction region is disposed or supported on the $NO_x$ storage region, all or part of the $NO_x$ reduction region is preferably disposed directly on to the $NO_x$ storage region (i.e. $NO_x$ reduction region is in contact with a surface of the $NO_x$ storage region). The $NO_x$ reduction region may be a $NO_x$ reduction layer and the $NO_x$ storage region may be a $NO_x$ storage layer.

Typically, in the catalyst of the invention:

(a) the $NO_x$ reduction region is a $NO_x$ reduction zone disposed at an outlet end of the substrate and the $NO_x$ storage region is a $NO_x$ storage zone disposed at an inlet end of the substrate; or (b) the $NO_x$ reduction region is a $NO_x$ reduction zone disposed at an inlet end of the substrate and the $NO_x$ storage region is a $NO_x$ storage zone disposed at an outlet end of the substrate; or (b) the $NO_x$ storage region is a $NO_x$ storage layer and the $NO_x$ reduction region is a $NO_x$ reduction zone, wherein the $NO_x$ reduction zone is disposed on the $NO_x$ storage layer at an outlet end of the substrate; or (c) the $NO_x$ storage region is a $NO_x$ storage layer and the $NO_x$ reduction region is a $NO_x$ reduction layer, and wherein the $NO_x$ reduction layer is disposed on the $NO_x$ storage layer.

The $NO_x$ storage layer may extend for an entire length (i.e. substantially an entire length) of the substrate.

Typically, the $NO_x$ reduction layer extends for an entire length (i.e. substantially an entire length) of the substrate.

It may be preferable that $NO_x$ storage region is a $NO_x$ storage zone. More preferably, the $NO_x$ storage zone is disposed or supported at or near an inlet end of the substrate. In such an arrangement, the catalyst may show advantageous oxidative activity (e.g. toward CO and HCs).

In a first catalyst arrangement, the $NO_x$ storage region is disposed or supported upstream of the $NO_x$ reduction zone. Preferably, the $NO_x$ storage region is a $NO_x$ storage zone. More preferably, the $NO_x$ storage zone is disposed or supported at or near an inlet end of the substrate.

Typically, the $NO_x$ storage zone has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

The $NO_x$ reduction zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

The $NO_x$ storage zone may adjoin the $NO_x$ reduction zone. Preferably, the $NO_x$ storage zone is contact with the $NO_x$ reduction zone. When the $NO_x$ storage zone adjoins the $NO_x$ reduction zone or the $NO_x$ storage zone is in contact with the $NO_x$ reduction zone, then the $NO_x$ storage zone and the $NO_x$ reduction zone may be disposed or supported on the substrate as a layer (e.g. a single layer). Thus, a layer (e.g. a single) may be formed on the substrate when the $NO_x$ storage and $NO_x$ reduction zones adjoin or are in contact with one another. Such an arrangement may avoid problems with back pressure.

In a second catalyst arrangement, the $NO_x$ storage region is a $NO_x$ storage layer. It is preferred that the $NO_x$ storage layer extends for an entire length (i.e. substantially an entire length) of the substrate, particularly the entire length of the channels of a substrate monolith.

The $NO_x$ reduction zone is typically disposed or supported on the $NO_x$ storage layer. Preferably the $NO_x$ reduction zone is disposed directly on to the $NO_x$ storage layer (i.e. the $NO_x$ reduction zone is in contact with a surface of the $NO_x$ storage layer).

When the $NO_x$ reduction zone is disposed or supported on the $NO_x$ storage layer, it is preferred that the entire length of the $NO_x$ reduction zone is disposed or supported on the $NO_x$ storage layer. The length of the $NO_x$ reduction zone is less than the length of the $NO_x$ storage layer.

In a third catalyst arrangement, the $NO_x$ storage region is a $NO_x$ storage layer. It is preferred that the $NO_x$ storage layer extends for an entire length (i.e. substantially an entire length) of the substrate, particularly the entire length of the channels of a substrate monolith.

The $NO_x$ reduction region is a $NO_x$ reduction layer. It is preferred that the $NO_x$ reduction layer extends for an entire length (i.e. substantially an entire length) of the substrate, particularly the entire length of the channels of a substrate monolith.

The $NO_x$ reduction layer is disposed or supported on the $NO_x$ storage layer. Preferably the $NO_x$ reduction layer is disposed directly on to the $NO_x$ storage layer (i.e. the $NO_x$ reduction layer is in contact with a surface of the $NO_x$ storage layer).

Generally, the catalyst comprises an oxidation region disposed or supported on:

(a) the $NO_x$ storage region; and/or (b) the $NO_x$ reduction region.

The oxidation region may be an oxidation layer. The oxidation layer may extend for an entire length (i.e. substantially an entire length) of the substrate.

The oxidation layer may overlap the $NO_x$ reduction layer. Thus, an end portion or part of the oxidation layer may be disposed or supported on the $NO_x$ reduction layer. The oxidation layer may completely or partly overlap the $NO_x$ reduction layer.

When the $NO_x$ storage layer is covered by the $NO_x$ reduction layer and/or the oxidation layer, the sulfur poisoning of the Mn component can be reduced or prevented.

The oxidation region may be an oxidation zone. When the oxidation region is an oxidation zone, then typically the oxidation zone has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

The regions, zones and layers described hereinabove may be prepared using conventional methods for making and applying washcoats onto a substrate are also known in the art (see, for example, our WO 99/47260, WO 2007/077462 and WO 2011/080525).

It may be preferable to pre-form the $NO_x$ storage material to ensure the correct arrangement of supported components and to then make a washcoat containing the pre-formed material.

Substrates for supporting catalysts for treating an exhaust gas from a lean burn engine are well known in the art.

The substrate typically has a plurality of channels (e.g. for the exhaust gas to flow through). Generally, the substrate is a ceramic material or a metallic material.

It is preferred that the substrate is made or composed of cordierite ($SiO_2$—$Al_2O_3$—$MgO$), silicon carbide (SiC), Fe—Cr—Al alloy, Ni—Cr—Al alloy, or a stainless steel alloy.

Typically, the substrate is a monolith (also referred to herein as a substrate monolith). Such monoliths are well-known in the art. The substrate monolith may be a flow-through monolith or a filtering monolith.

A flow-through monolith typically comprises a honeycomb monolith (e.g. a metal or ceramic honeycomb monolith) having a plurality of channels extending therethrough, which channels are open at both ends.

A filtering monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure.

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

It is preferred that the substrate is a flow-through monolith.

In principle, the substrate may be of any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

The invention also provides an exhaust system comprising the catalyst and an emissions control device. The emissions control device is preferably downstream of the catalyst.

Examples of an emissions control device include a diesel particulate filter (DPF), a $NO_x$ storage catalyst (NSC), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC) and combinations of two or more thereof. Such emissions control devices are all well known in the art. It is preferred that the emissions control device is a selective catalytic reduction (SCR) catalyst or a selective catalytic reduction filter (SCRF™) catalyst Some of the aforementioned emissions control devices have filtering substrates. An emissions control device having a filtering substrate may be selected from the group consisting of a diesel particulate filter (DPF), a catalysed soot filter (CSF), and a selective catalytic reduction filter (SCRF™) catalyst.

It is preferred that the exhaust system comprises an emissions control device selected from the group consisting of an ammonia slip catalyst (ASC), diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a diesel particulate filter (DPF), a selective catalytic reduction (SCR) catalyst, a catalysed soot filter (CSF), a selective catalytic reduction filter (SCRF™) catalyst, and combinations of two or more thereof. Even more preferably, the emissions control device is a selective catalytic reduction (SCR) catalyst or a selective catalytic reduction filter (SCRF™) catalyst.

When the exhaust system of the invention comprises an SCR catalyst or an SCRF™ catalyst, then the exhaust system may further comprise an injector for injecting a nitrogenous reductant, such as ammonia, or an ammonia precursor, such as urea or ammonium formate, preferably urea, into exhaust gas downstream of the oxidation catalyst and upstream of the SCR catalyst or the SCRF™ catalyst. Such an injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas. Ammonia can also be generated by heating ammonium carbamate (a solid) and the ammonia generated can be injected into the exhaust gas.

Alternatively or in addition to the injector, ammonia can be generated in situ (e.g. during rich regeneration of the catalyst of the invention disposed upstream of the SCR catalyst or the SCRF™ catalyst). Thus, the exhaust system may further comprise an engine management means for enriching the exhaust gas with hydrocarbons.

The SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide (e.g. $V_2O_5/WO_3/TiO_2$, $WO_x/CeZrO_2$, $WO_x/ZrO_2$ or $Fe/WO_x/ZrO_2$).

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

In the exhaust system of the invention, preferred molecular sieves for an SCR catalyst or an SCRF™ catalyst are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

In a first exhaust system embodiment, the exhaust system comprises the catalyst of the invention and a catalysed soot filter (CSF). The catalyst is typically followed by (e.g. is upstream of) the catalysed soot filter (CSF). Thus, for example, an outlet of the oxidation catalyst is connected to an inlet of the catalysed soot filter.

In a second exhaust system embodiment, the exhaust system comprises the catalyst of the invention, a catalysed soot filter (CSF) and a selective catalytic reduction (SCR) catalyst. The catalyst is typically followed by (e.g. is upstream of) the catalysed soot filter (CSF). The catalysed soot filter is typically followed by (e.g. is upstream of) the selective catalytic reduction (SCR) catalyst. A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

In a third exhaust system embodiment, the exhaust system comprises the catalyst of the invention, a selective catalytic reduction (SCR) catalyst and either a catalysed soot filter (CSF) or a diesel particulate filter (DPF).

In the third exhaust system embodiment, the catalyst of the invention is typically followed by (e.g. is upstream of) the selective catalytic reduction (SCR) catalyst. A nitrogenous reductant injector may be arranged between the catalyst and the selective catalytic reduction (SCR) catalyst. Thus, the catalyst may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the diesel particulate filter (DPF).

A fourth exhaust system embodiment comprises the catalyst of the invention and a selective catalytic reduction filter (SCRF™) catalyst. The catalyst of the invention is typically followed by (e.g. is upstream of) the selective catalytic reduction filter (SCRF™) catalyst. A nitrogenous reductant injector may be arranged between the catalyst and the selective catalytic reduction filter (SCRF™) catalyst. Thus, the catalyst may be followed by (e.g. is upstream of) a nitrogenous reductant injector, and the nitrogenous reductant injector may be followed by (e.g. is upstream of) the selective catalytic reduction filter (SCRF™) catalyst.

When the exhaust system comprises a selective catalytic reduction (SCR) catalyst or a selective catalytic reduction filter (SCRF™) catalyst, such as in the second to fourth exhaust system embodiments described hereinabove, an ASC can be disposed downstream from the SCR catalyst or the SCRF™ catalyst (i.e. as a separate substrate monolith), or more preferably a zone on a downstream or trailing end of the substrate monolith comprising the SCR catalyst can be used as a support for the ASC.

In general, the exhaust system of the invention may comprise a hydrocarbon supply apparatus (e.g. for generating a rich exhaust gas). The hydrocarbon supply apparatus may be disposed upstream of the catalyst of the invention. The hydrocarbon supply apparatus is typically disposed downstream of the exhaust outlet of the lean burn engine.

The hydrocarbon supply apparatus may be electronically coupled to an engine management system, which is configured to inject hydrocarbon into the exhaust gas for releasing $NO_x$ (e.g. stored $NO_x$) from the catalyst.

The hydrocarbon supply apparatus may be an injector. The hydrocarbon supply apparatus or injector is suitable for injecting fuel into the exhaust gas.

Alternatively or in addition to the hydrocarbon supply apparatus, the lean burn engine may comprise an engine management system (e.g. an engine control unit [ECU]). The engine management system is configured for in-cylinder injection of the hydrocarbon (e.g. fuel) for releasing $NO_x$ (e.g. stored $NO_x$) from the catalyst.

Generally, the engine management system is coupled to a sensor in the exhaust system, which monitors the status of the catalyst. Such a sensor may be disposed downstream of the catalyst. The sensor may monitor the $NO_x$ composition of the exhaust gas at the outlet of the catalyst.

In general, the hydrocarbon is fuel, preferably diesel fuel.

Another aspect of the invention relates to a vehicle or an apparatus. The vehicle or apparatus comprises a lean burn engine. The lean burn engine is typically a diesel engine.

The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of 8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

A further aspect of the invention relates to a method of treating an exhaust gas from a lean burn engine. The method comprises contacting an exhaust gas produced by the lean burn engine with a catalyst of the invention.

The step of contacting the exhaust gas produced by the lean burn engine with the catalyst is typically a step of passing the exhaust gas through the catalyst.

The expression "treating an exhaust gas" in this context refers to converting nitrogen oxides (NOx) to nitrogen and oxidising carbon monoxide (CO), hydrocarbons (HCs) and nitric oxide (NO) in an exhaust gas from a lean burn engine.

Definitions

Reference is made herein to a "region", such as a $NO_x$ storage region, a $NO_x$ reduction region or an oxidation region. Typically, each "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the region when comparing one part of the region with another part of that region). Substantially uniform composition in this context refers to a material where the difference in composition when comparing one part of the region with another part of the region is 5% or less, usually 2.5% or less, and most commonly 1% or less.

The term "zone" as used herein refers to a region having a length that is less than the total length of the substrate, such as 75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:
(a) nearer to an inlet end (e.g. open end) of an inlet channel of the substrate than the zone is to a closed end (e.g. blocked or plugged end) of the inlet channel, and/or
(b) nearer to a closed end (e.g. blocked or plugged end) of an outlet channel of the substrate than the zone is to an outlet end (e.g. open end) of the outlet channel.

Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:
(a) nearer to an outlet end (e.g. an open end) of an outlet channel of the substrate than the zone is to a closed end (e.g. blocked or plugged) of the outlet channel, and/or
(b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise".

Any reference to an amount of dopant, particularly a total amount, expressed as a % by weight as used herein refers to the weight of the support material or the refractory oxide thereof.

EXAMPLES

The invention will now be illustrated by the following non-limiting examples.

Comparative Example 1

Ceria/magnesium-aluminate spinel was spray dried with barium and the powder was slurried in water and milled to a $d_{90}$ of less than 20 microns. Appropriate amounts of soluble platinum and palladium salts were added to the slurry followed by 32% particulate ceria and 4% alumina binder. The slurry was stirred to homogenise then applied to a cordierite flow through monolith having 400 cells per square inch using established coating techniques.

The part was dried and calcined at 500° C. The finished catalyst had a PGM loading of 20 g ft$^{-3}$ and a Ba loading of 800 g ft$^{-3}$.

Example 1

Ceria/magnesium-aluminate spinel was spray dried with barium and the powder was slurried in water and milled to a $d_{90}$ of less than 20 microns. Appropriate amounts of soluble platinum and palladium salts were added to the slurry followed by Mn nitrate and 32% particulate ceria and 4% alumina binder. The slurry was stirred to homogenise then applied to a cordierite flow through monolith having 400 cells per square inch using established coating techniques. The part was dried and calcined at 500° C. The finished catalyst had a PGM loading of 20 g ft$^{-3}$, a Mn loading of 150 g ft$^{-3}$ and a Ba loading of 800 g ft$^{-3}$.

Experimental Results
Measurement of NO Stored

Core samples were taken from the catalysts of Comparative Example 1 and Example 1 above. Both cores were hydrothermally aged (with water) in an oven at 800° C. for 5 hours. The catalytic activity was determined using a synthetic gas bench activity test (SCAT). The aged cores were tested in a simulated catalyst activity testing (SCAT) gas apparatus using the inlet gas mixtures in Table 1.

TABLE 1

| | |
|---|---|
| CO | 1500 ppm |
| HC (as $C_1$) | 430 ppm |
| NO | 100 ppm |
| $CO_2$ | 4% |
| $H_2O$ | 4% |

TABLE 1-continued

| | |
|---|---|
| $O_2$ | 14% |
| Space velocity | 55000/hour |

Results

The catalytic activity was measured under lean conditions. Two results were obtained: (1) first activity was measured after a rich preconditioning, so the catalyst is in an activated state, and (2) a second activity was measured after deactivation of the catalyst following a ramp to 600° C. under lean conditions. The second activity (deactivated state) is shown in Table 2.

TABLE 2

| Catalysts | $NO_x$ stored at 350° C. (g/L) | $NO_x$ stored at 400° C. (g/L) | $NO_x$ stored at 450° C. (g/L) |
|---|---|---|---|
| Comparative Example 1 | 0.23 | 0.32 | 0.42 |
| Example 1 | 0.62 | 1.42 | 1.38 |

The results in Table 2 show that the catalyst with Mn (Example 1) in the aged condition stores more $NO_x$ at 350, 400 and 450° C. than the catalyst without Mn (Comparative Example 1).

Comparative Example 2

Preparation of $NO_x$ Storage Layer

Ceria/magnesium-aluminate spinel was spray dried with barium and the powder was slurried in water and milled to a $d_{90}$ of less than 20 microns. Appropriate amounts of soluble platinum and palladium salts were added to the slurry followed by 33% particulate ceria and 4% alumina binder. The slurry was stirred to homogenise then applied to a cordierite flow through monolith having 400 cells per square inch using established coating techniques. The part was dried and calcined at 500° C. The applied catalyst coating had a PGM loading of 11.3 g ft$^{-3}$ and a Ba loading of 800 g ft$^{-3}$.

Preparation of $NO_x$ Reduction Layer

A first slurry was prepared by suspending cerium oxide in water followed by appropriate amounts of soluble platinum and palladium salts. A second slurry was prepared by suspending cerium oxide in water followed by appropriate amounts of soluble rhodium salt. The pH of the second slurry was raised to 7 then the first and second slurries were combined. Alumina binder (30%) was added to the combined slurry. The slurry was stirred to homogenise then applied as a second coating layer using established coating techniques. The part was dried and calcined at 500° C. The applied catalyst coating had a PGM loading of 55.9 g ft$^{-3}$.

Preparation of Oxidation Layer

Barium acetate was suspended in water and added to silica-alumina powder. The content of barium was 4.8% by mass of the silica-alumina. Appropriate amounts of soluble platinum and palladium salts were added to this slurry followed by beta zeolite, such that the slurry solids comprised 20% zeolite by weight. The slurry was stirred to homogenise. The slurry was applied as a layer on the inlet channels of the substrate using established coating techniques. The part was dried and calcined at 500° C. The applied catalyst coating had a PGM loading of 50.9 g ft$^{-3}$.

The finished catalyst had a total PGM loading of 118 g ft$^{-3}$.

Example 2

Preparation of $NO_x$ Storage Layer

Ceria/magnesium-aluminate spinel was spray dried with barium and the powder was slurried in water and milled to a $d_{90}$ of less than 20 microns. Appropriate amounts of soluble platinum and palladium salts were added to the slurry followed by Mn nitrate and 32% particulate ceria and 4% alumina binder. The slurry was stirred to homogenise then applied to a cordierite flow through monolith having 400 cells per square inch using established coating techniques. The part was dried and calcined at 500° C. The applied catalyst coating had a PGM loading of 11.3 g ft$^{-3}$, a Mn loading of 150 g ft$^{-3}$ and a Ba loading of 800 g ft$^{-3}$.

Preparation of $NO_x$ Reduction Layer

A first slurry was prepared by suspending cerium oxide in water followed by appropriate amounts of soluble platinum and palladium salts. A second slurry was prepared by suspending cerium oxide in water followed by appropriate amounts of soluble rhodium salt. The pH of the second slurry was raised to 7 then the first and second slurries were combined. Alumina binder (30%) was added to the combined slurry. The slurry was stirred to homogenise then applied as a second coating layer using established coating techniques. The part was dried and calcined at 500° C. The applied catalyst coating had a PGM loading of 55.9 g ft$^{-3}$.

Preparation of Oxidation Layer

Barium acetate was suspended in water and added to silica-alumina powder. The content of barium was 4.8% by mass of the silica-alumina. Appropriate amounts of soluble platinum and palladium salts were added to this slurry followed by beta zeolite, such that the slurry solids comprised 20% zeolite by weight. The slurry was stirred to homogenise. The slurry was applied as a layer on the inlet channels of the substrate using established coating techniques. The part was dried and calcined at 500° C. The applied catalyst coating had a PGM loading of 50.9 g ft$^{-3}$.

The finished catalyst had a total PGM loading of 118 g ft$^{-3}$.

Example 3

Preparation of $NO_x$ Storage Layer

Ceria/magnesium-aluminate spinel was spray dried with barium and the powder was slurried in water and milled to a $d_{90}$ of less than 20 microns. No soluble platinum and palladium salts were added to the slurry. Mn nitrate was added to the slurry followed by 32% particulate ceria and 4% alumina binder. The slurry was stirred to homogenise then applied to a cordierite flow through monolith having 400 cells per square inch using established coating techniques. The part was dried and calcined at 500° C. The applied catalyst coating had a Mn loading of 150 g ft$^{-3}$ and a Ba loading of 800 g ft$^{-3}$.

Preparation of $NO_x$ Reduction Layer

A first slurry was prepared by suspending cerium oxide in water followed by appropriate amounts of soluble platinum and palladium salts. A second slurry was prepared by suspending cerium oxide in water followed by appropriate amounts of soluble rhodium salt. The pH of the second slurry was raised to 7 then the first and second slurries were combined. Alumina binder (30%) was added to the combined slurry. The slurry was stirred to homogenise then applied as a second coating layer using established coating techniques. The part was dried and calcined at 500° C. The applied catalyst coating had a PGM loading of 55.9 g ft$^{-3}$.

Preparation of Oxidation Layer

Barium acetate was suspended in water and added to silica-alumina powder. The content of barium was 4.8% by mass of the silica-alumina. Appropriate amounts of soluble platinum and palladium salts were added to this slurry followed by beta zeolite, such that the slurry solids comprised 20% zeolite by weight. The slurry was stirred to homogenise. The slurry was applied as a layer on the inlet channels of the substrate using established coating techniques. The part was dried and calcined at 500° C. The applied catalyst coating had a PGM loading of 50.9 g ft$^{-3}$.

The finished catalyst had a total PGM loading of 107 g ft$^{-3}$.

Example 4

Preparation of NO$_x$ Storage Layer

Ceria/magnesium-aluminate spinel was spray dried with barium and the powder was slurried in water and milled to a d$_{90}$ of less than 20 microns. No soluble platinum and palladium salts were added to the slurry. Mn nitrate was added to the slurry followed by 32% particulate ceria and 4% alumina binder. The slurry was stirred to homogenise then applied to a cordierite flow through monolith having 400 cells per square inch using established coating techniques. The part was dried and calcined at 500° C. The applied catalyst coating had a Mn loading of 300 g ft$^{-3}$ and a Ba loading of 800 g ft$^{-3}$.

Preparation of NO$_x$ Reduction Layer

A first slurry was prepared by suspending cerium oxide in water followed by appropriate amounts of soluble platinum and palladium salts. A second slurry was prepared by suspending cerium oxide in water followed by appropriate amounts of soluble rhodium salt. The pH of the second slurry was raised to 7 then the first and second slurries combined. Alumina binder (30%) was added to the combined slurry. The slurry was stirred to homogenise then applied as a second coating layer using established coating techniques. The part was dried and calcined at 500° C. The applied catalyst coating had a PGM loading of 55.9 g ft$^{-3}$.

Preparation of Oxidation Layer

Barium acetate was suspended in water and added to silica-alumina powder. The content of barium was 4.8% by mass of the silica-alumina. Appropriate amounts of soluble platinum and palladium salts were added to this slurry followed by beta zeolite, such that the slurry solids comprised 20% zeolite by weight. The slurry was stirred to homogenise. The slurry was applied as a layer on the inlet channels of the substrate using established coating techniques. The part was dried and calcined at 500° C. The applied catalyst coating had a PGM loading of 50.9 g ft$^{-3}$.

The finished catalyst had a total PGM loading of 107 g ft$^{-3}$.

Experimental Results

Measurement of CO/HC Light Off and NO$_x$ Stored

Two core samples were taken from each of the catalysts above. The first cores were kept in their original state (i.e. they were tested in a 'fresh' condition). The second cores were hydrothermally aged (with water) in an oven at 800° C. for 5 hours. The catalytic activity was determined using a synthetic gas bench activity test (SCAT). All cores were tested in a simulated catalyst activity testing (SCAT) gas apparatus using the inlet gas mixture shown in Table 1.

Results

The catalytic activity was measured under lean conditions. Two results were obtained: (1) first activity was measured after a rich preconditioning, so the catalyst is in an activated state, and (2) second activity was measured after deactivation of the catalyst following a ramp to 600° C. under lean conditions. The second activity (deactivated state) is shown in Tables 3 and 4. The CO and HC oxidation activity shown in Table 3 is for the aged condition and is measured as a light off temperature where 50% conversion is achieved (T50).

TABLE 3

| Catalysts | T50 CO light-off (° C.) | T50 HC light-off (° C.) |
|---|---|---|
| Comparative Example 2 | 159 | 170 |
| Example 2 | 158 | 164 |
| Example 3 | 158 | 164 |
| Example 4 | 157 | 164 |

The results in Table 3 show that aged catalysts containing Mn have a lower light off temperature than the catalyst that does not contain Mn (Comparative Example 2). The results in Table 4 show that catalysts containing Mn store more NO in the both the fresh and aged conditions than the catalyst that does not contain Mn (Comparative Example 2).

TABLE 4

| | NO$_x$ stored at 350° C. (g/L) | | NO$_x$ stored at 400° C. (g/L) | | NO$_x$ stored at 450° C. (g/L) | |
|---|---|---|---|---|---|---|
| Catalysts | fresh | aged | fresh | aged | fresh | aged |
| Comparative Example 2 | 0.7 | 0.1 | 0.9 | 1.3 | 0.9 | 1.1 |
| Example 2 | 1.3 | 1.7 | 1.5 | 2.2 | 1.2 | 2.1 |
| Example 3 | 1.2 | 1.6 | 1.6 | 2.1 | 1.3 | 2.2 |
| Example 4 | 1.4 | 1.7 | 1.7 | 2.2 | 1.3 | 2.1 |

Further activity testing was performed on a diesel bench mounted engine. Tests were run using a simulated Worldwide Harmonised Light Duty Test Cycle (WLTC). The results are shown in Table 5. The test procedure consisted of a CSF (Catalysed Soot Filter) regeneration preconditioning step, followed by three WLTCs. Each WLTC contained 4 rich deNO$_x$ purges at fixed points during the cycle, their duration controlled by lambda sensor feedback. Three WLTC tests were run on each catalyst to stabilise the activity. Cumulative emission results from the third cycle are reported in Table 5.

TABLE 5

| | Cumulative tailpipe: | | |
|---|---|---|---|
| Catalysts | NO$_x$ (g) | CO (g) | HC (g) |
| Comparative Example 2 | 2.6 | 11.7 | 2.0 |
| Example 2 | 1.9 | 10.4 | 1.9 |
| Example 3 | 1.6 | 13.1 | 1.8 |
| Example 4 | — | — | — |

The results in Table 5 show that catalysts comprising Mn give lower cumulative NO$_x$ emissions than the catalyst that does not contain Mn (Comparative Example 2). Lower cumulative CO and HC emissions are also seen for the catalyst of Example 2 (which comprises Mn) compared to the catalyst of Comparative Example 2, which has the same PGM loading and does not comprise Mn.

For the avoidance of any doubt, the entire content of any and all documents cited herein is incorporated by reference into the present application.

The invention claimed is:

1. A catalyst for storing nitrogen oxides (NO$_x$) in an exhaust gas from a lean burn engine comprising a plurality of particles of a $NO_x$ storage material, wherein each particle of the $NO_x$ storage material comprises at least one particle of a $NO_x$ storage component and at least one particle of an NO oxidation promoter, both particles of the $NO_x$ storage component and the NO oxidation promoter being disposed on a common particle of a support material, wherein the NO oxidation promoter is manganese or an oxide, hydroxide or carbonate thereof.

2. The catalyst according to claim 1, wherein the storage material comprises a mixed oxide of magnesium oxide (MgO) and aluminum oxide ($Al_2O_3$).

3. The catalyst according to claim 1, wherein the $NO_x$ storage component comprises (i) an oxide, a carbonate or a hydroxide of an alkali metal; (ii) an oxide, a carbonate or a hydroxide of an alkaline earth metal; and/or (iii) an oxide, a carbonate or a hydroxide of a rare earth metal.

4. The catalyst according to claim 1, wherein the $NO_x$ storage material further comprises at least one particle of a platinum group metal (PGM) that is platinum, palladium, or a combination of platinum and palladium disposed or supported on the common particle of the support material.

5. The catalyst according to claim 1, wherein the $NO_x$ storage material does not comprise at least one of platinum and palladium.

6. A catalyst body comprising the catalyst according to claim 1 and a substrate, wherein the $NO_x$ storage material is dispersed in or disposed on the substrate, so as to form a $NO_x$ storage region comprising the $NO_x$ storage material.

7. The catalyst body according to claim 6, wherein the $NO_x$ storage region further comprises a $NO_x$ treatment material, wherein the $NO_x$ treatment material comprises at least one of a first $NO_x$ treatment component and a second $NO_x$ treatment component.

8. The catalyst body according to claim 7, wherein the first $NO_x$ treatment component comprises a first $NO_x$ treatment support material, wherein the first treatment support material comprises ceria or ceria-zirconia.

9. The catalyst body according to claim 7, wherein first $NO_x$ treatment component comprises the NO oxidation promoter disposed in or supported on the first $NO_x$ treatment support material.

10. The catalyst body according to claim 7, wherein the first $NO_x$ treatment component comprises a platinum group metal (PGM) disposed or supported on the first $NO_x$ treatment support material, wherein the PGM is selected from the group consisting of palladium, rhodium and a combination of palladium and rhodium.

11. The catalyst body according to claim 7, wherein the first $NO_x$ treatment component comprises a $NO_x$ storage component disposed or supported on the first $NO_x$ treatment support material, wherein the $NO_x$ storage component comprises an oxide, a carbonate or a hydroxide of barium (Ba).

12. The catalyst body according to claim 7, wherein the second $NO_x$ treatment component comprises a second $NO_x$ treatment support material comprising a mixed oxide of magnesium oxide (MgO) and aluminum oxide ($Al_2O_3$).

13. The catalyst body according to claim 12, wherein the second $NO_x$ treatment component comprises the NO oxidation promoter disposed or supported on the second $NO_x$ treatment support material.

14. The catalyst body according to claim 12, wherein the second $NO_x$ treatment component comprises a $NO_x$ storage component disposed or supported on the second $NO_x$ treatment support material, wherein the $NO_x$ storage component comprises an oxide, a carbonate or a hydroxide of barium (Ba).

15. The catalyst body according to claim 12, wherein second $NO_x$ treatment component comprises a platinum group metal (PGM) disposed or supported on the second $NO_x$ treatment support material, wherein the PGM is selected from platinum, palladium and a combination of platinum and palladium.

16. The catalyst body according to claim 6 further comprising a $NO_x$ reduction region disposed or supported on the $NO_x$ storage region.

17. The catalyst body according to claim 16, where the $NO_x$ reduction region comprises a $NO_x$ reduction component, wherein the $NO_x$ reduction component comprises rhodium disposed or supported on a $NO_x$ reduction support material.

18. The catalyst body according to claim 17, wherein the $NO_x$ reduction support material comprises at least one of an oxide of aluminum and an oxide of cerium.

19. An exhaust system comprising a catalyst as defined in claim 1 and an emissions control device.

20. The catalyst according to claim 1, wherein the $NO_x$ storage component comprises an oxide, a carbonate or a hydroxide of barium (Ba).

21. The catalyst body of claim 6, wherein the $NO_x$ storage material is disposed on the substrate.

* * * * *